(12) United States Patent
Ramirez et al.

(10) Patent No.: US 10,429,889 B2
(45) Date of Patent: Oct. 1, 2019

(54) INFORMATION HANDLING SYSTEM DOCKING WITH COORDINATED POWER AND DATA COMMUNICATION

(71) Applicant: Dell Products L.P., Round Rock, TX (US)

(72) Inventors: Ernesto Ramirez, Austin, TX (US); Christian L Critz, Georgetown, TX (US); Liam B Quinn, Austin, TX (US); Sean P O'Neal, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 543 days.

(21) Appl. No.: 13/962,222

(22) Filed: Aug. 8, 2013

(65) Prior Publication Data

US 2015/0046623 A1   Feb. 12, 2015

(51) Int. Cl.
| | |
|---|---|
| *G06F 13/00* | (2006.01) |
| *G06F 13/14* | (2006.01) |
| *G06F 13/36* | (2006.01) |
| *G06F 1/16* | (2006.01) |
| *G06F 13/40* | (2006.01) |
| *H04L 1/00* | (2006.01) |

(52) U.S. Cl.
CPC .......... *G06F 1/1632* (2013.01); *G06F 13/409* (2013.01); *H04L 1/0044* (2013.01); *H04L 1/0053* (2013.01)

(58) Field of Classification Search
CPC .... G06F 1/1632; H04L 1/0044; H04L 1/0053
USPC ................................ 710/303, 304, 305, 306
See application file for complete search history.

(56) References Cited

U.S. PATENT DOCUMENTS

| | | | |
|---|---|---|---|
| 6,807,055 B2 * | 10/2004 | Usui | G06F 1/1632 361/679.4 |
| 8,549,205 B1 | 10/2013 | Harriman et al. | |
| 2004/0198430 A1 | 10/2004 | Moriyama et al. | |
| 2005/0013103 A1 | 1/2005 | Chandley | |
| 2006/0193295 A1 | 8/2006 | White et al. | |
| 2006/0233191 A1 | 10/2006 | Pirzada et al. | |
| 2008/0002350 A1 * | 1/2008 | Farrugia | G06F 1/1632 361/679.43 |
| 2009/0009815 A1 * | 1/2009 | Karasik | G06F 17/30634 358/403 |
| 2009/0112339 A1 | 4/2009 | Huang et al. | |

(Continued)

OTHER PUBLICATIONS

International Search Report and Written Opinion for PCT Application No. PCT/US2014/033277, dated Oct. 28, 2014.

*Primary Examiner* — Getente A Yimer
(74) *Attorney, Agent, or Firm* — Zagorin Cave LLP; Robert W. Holland

(57) ABSTRACT

A docking station connects through a docking port and docking cable with an information handling system to support communication between the information handling system and docking station peripherals. On initial interface, one data lane of the docking port establishes a temporary management interface, such as an I2C management bus, to configure the docking station. After configuration, a docking manager, virtual wireless access point and power block cooperate to assign data lanes of the docking port and wireless communication resources to information transfer and power transfer functions based upon processing and communication tasks performed at the information handling system.

18 Claims, 8 Drawing Sheets

(56) References Cited

U.S. PATENT DOCUMENTS

| | | | |
|---|---|---|---|
| 2009/0177908 A1* | 7/2009 | Baarman | G06F 1/1632 |
| | | | 713/340 |
| 2010/0131691 A1* | 5/2010 | Chatterjee | G06F 1/1632 |
| | | | 710/303 |
| 2010/0169531 A1* | 7/2010 | Bae | G06F 1/1632 |
| | | | 710/303 |
| 2010/0191984 A1* | 7/2010 | Ghosh | G06F 1/266 |
| | | | 713/300 |
| 2010/0246119 A1 | 9/2010 | Collopy et al. | |
| 2010/0295384 A1 | 11/2010 | Kobayashi | |
| 2011/0057966 A1* | 3/2011 | Ono | G09G 3/3233 |
| | | | 345/690 |
| 2012/0099566 A1 | 4/2012 | Laine et al. | |
| 2012/0265913 A1 | 10/2012 | Suumaki et al. | |
| 2013/0016032 A1 | 1/2013 | Margulis | |
| 2013/0031377 A1 | 1/2013 | Sultenfuss et al. | |
| 2013/0054863 A1 | 2/2013 | Imes et al. | |
| 2013/0124762 A1 | 5/2013 | Tamir et al. | |
| 2013/0182190 A1* | 7/2013 | McCartney | H04B 3/54 |
| | | | 348/730 |
| 2014/0250513 A1 | 9/2014 | Cao et al. | |
| 2014/0281753 A1 | 9/2014 | Wagh et al. | |
| 2014/0359318 A1* | 12/2014 | Liu | G06F 1/26 |
| | | | 713/300 |
| 2015/0356045 A1* | 12/2015 | Soffer | G06F 13/4221 |
| | | | 710/303 |

\* cited by examiner

INFORMATION HANDLING SYSTEM DOCKING WITH COORDINATED POWER AND DATA COMMUNICATION

CROSS REFERENCE TO RELATED APPLICATIONS

U.S. patent application Ser. No. 13/962,200, entitled "Information Handling System Docking with Coordinated Power and Data Communication," inventors Ernesto Ramirez, Christian L. Critz, Liam B. Quinn, and Sean P. O'Neal, filed Aug. 8, 2013, describes exemplary methods and systems and is incorporated by reference in its entirety.

U.S. patent application Ser.No. 13/962,255, entitled "Information Handling System Docking with Coordinated Power and Data Communication," inventors Ernesto Ramirez, Christian L. Critz, Liam B. Quinn, and Sean P. O'Neal, filed Aug. 8, 2013, describes exemplary methods and systems and is incorporated by reference in its entirety.

BACKGROUND OF THE INVENTION

Field of the Invention

The present invention relates in general to the field of information handling system docking, and more particularly to information handling system docking with coordinated power and data communications.

Description of the Related Art

As the value and use of information between and across devices continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems perform a large number of functions for both individuals and for business use. Generally, information handling systems perform these functions by executing applications stored in local memory that create or alter information stored locally and at networked locations. As an example, enterprises typically have a data center that includes centralized storage of information and one or more server information handling systems that provide the information to client information handling systems through a network. In a conventional office environment, employees have work areas with a dedicated desktop information handling system that executes word processing, spreadsheet, web browsing and e-mail applications and connectivity to peripheral devices and platforms, that also may generate or consume data, so that employees can perform enterprise duties. Generally, each work area has a dedicated local area network Ethernet interface to provide the desktop information handling system with communication to the data center. In addition, each area includes dedicated and/or shared peripherals, such as a display, keyboard, mouse and shared networked printer. Often home office environments have a similar configuration built around a router or modem that provides Internet access and peripheral sharing instead of around a data center and server information handling system.

This conventional work area configuration makes sense for employees who work only in the work area during working hours, however, a growing number of employees work in less-conventional arrangements. For instance, many enterprises have adopted home office policies that allow employees to work from home on certain days or under certain circumstances. Generally, such employees are provided with a portable information handling system to perform enterprise duties. As the expense associated with such portable systems has decreased over time, enterprises have made portable systems available to a greater number of employees so that employees have the improved productivity generally provided by improved access to enterprise information. In addition, employees have generally taken advantage of the decreased cost of portable information handling systems by purchasing systems for personal use. One common example of portable information handling systems often purchased for personal use by employees is the smartphone, which allows employees to make phone calls, communicate by text and e-mail, and browse the Internet through personal wireless wide area network (WWAN) telephone accounts or Internet hotspots.

Although portable information handling systems provide end users with increased convenience in the accessing of information outside of a work space, portable information handling systems tend to have less convenient input/output interfaces. For example, portable information handling systems tend to have smaller displays than are provided by a desktop system display peripheral and integrated keyboards with smaller and/or less ergonomic key configurations. In the case of tablet information handling systems, such as smartphones, the integrated keyboard is typically a virtual keyboard presented on a touchscreen, which generally does not provide an efficient interface for end users to make inputs. Often, end users will interface with smartphones and other tablet information handling systems by using peripheral devices, such as wireless keyboards and mice; however, the convenience of using a portable information handling system is diminished where an end user has to carry around peripheral devices and set up the portable system to interact with the peripheral devices.

One conventional solution that helps make portable information handling systems more effective tools in a work space is a docking station that interfaces the portable information handling system with the work space resources. Conventional docking stations typically include a specialized connector that couples to a portable information handling system to provide direct system access for peripherals connected with the docking station. For example, a docking station with a specialized connector is placed in a work space on a desktop and then interfaced with work space peripherals. The docking station might, for instance, include: a DisplayPort port that couples the dock through a DisplayPort cable to a conventional display; USB ports that couple the dock through USB cables to a keyboard, mouse and printer; an Ethernet port that couples the dock to a local area network (LAN); and a power cable that accepts AC power and an adapter that converts the AC power to DC power. A portable information handling system has a specialized port in its bottom surface that accepts the docking station connector in a fixed position on the desktop. The specialized port interfaces at a motherboard level with components of the portable information handling system so that an end user, in effect, couples separately to each of the peripherals through one docking station connector as if the end user had directly interfaced each peripheral to a port of the portable information handling system.

The advantage offered by a conventional docking station is that an end user can effectively turn a portable information handling system with limited I/O capabilities into a desktop system with multiple peripherals by simply placing the portable system into the docking station. A disadvantage of conventional docking stations is that the addition of a specialized docking port and direct motherboard connections increases the design and fabrication costs for the portable information handling system as well as the size of the portable system. It also limits the type of client device that connects/docks with the docking platform. One alternative is to interface a docking station with a standardized port of the information handling system, such as a USB port. A disadvantage of this type of docking station interface is that peripheral information can exceed the bandwidth available through the standardized port. Further, using the peripheral port protocol to communicate with the docking station tends to introduce latency due to translation between native and port protocols. Some of the bandwidth limitations are addressed by using wireless interfaces for some peripherals, such as Bluetooth to interface a portable system with a keyboard; however, using multiple interfaces tends to defeat the simplicity associated with a docking station having a single interface.

SUMMARY OF THE INVENTION

Therefore a need has arisen for a system and method which extends a unified interface consisting of power and IO interfaces to an external docking station.

In accordance with the present invention, a system and method are provided which substantially reduce the disadvantages and problems associated with previous methods and systems for interfacing an information handling system to a docking station in a work space. A docking cable connects a docking station to an information handling system with an initial configuration determined by a temporary setup of a docking port data lane as a management bus. After docking is configured, wired and wireless communication resources of the docking station, the information handling system and peripherals are dynamically managed to provide balanced video, data and power communication based upon communication tasks and processing tasks associated with the docking station.

More specifically, a docking station includes one or more docking ports to support cabled interfaces with one or more information handling systems, one or more peripheral ports to support cabled communication with one or more peripherals, and wireless resources to support wireless communication of information between the information handling systems and peripherals. A docking manager on the docking station and the information handling system at initial detection of a cable connection respond by temporarily establishing a management bus through a docking port data lane to exchange configuration information. After configuration of the docking station and information handling system according to the configuration information, the management interface is torn down and the data lane is used to communicate information, such as with a DisplayPort or USB protocol communication. Wired data lanes and wireless resources are dynamically assigned communication tasks to adjust to changing operations at the work space. For example, data lanes transfer video having heavy bandwidth demands but are re-assigned to transfer power when video bandwidth demands are relaxed. Wireless resources are assigned communication tasks to provide reduced demand on wired data lanes. A balance is maintained for communication and power transfer by re-assigning tasks dynamically as work load at the work spaces changes.

The present invention provides a number of important technical advantages. One example of an important technical advantage is that a smaller sized docking port adapts to power and communication tasks by multiplexing tasks to data lanes in a dynamic manner. Initial configuration is driven from an embedded controller or other firmware of an information handling system with a temporary management bus set up and tear down. Data lanes selectively provide DisplayPort or USB formatted information based upon the bandwidth requirements of tasks performed at the information handling system and the need for additional power transfer. By adapting data lanes to various tasks, the footprint of the information handling system is reduced since direct motherboard connections are not needed to support docking station operations. Further, the docking port adjusts to non-docking tasks by accepting related cables, such as DisplayPort or USB cables.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Docking station wireless and wired resources are dynamically allocated to accomplish communication and processing tasks of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
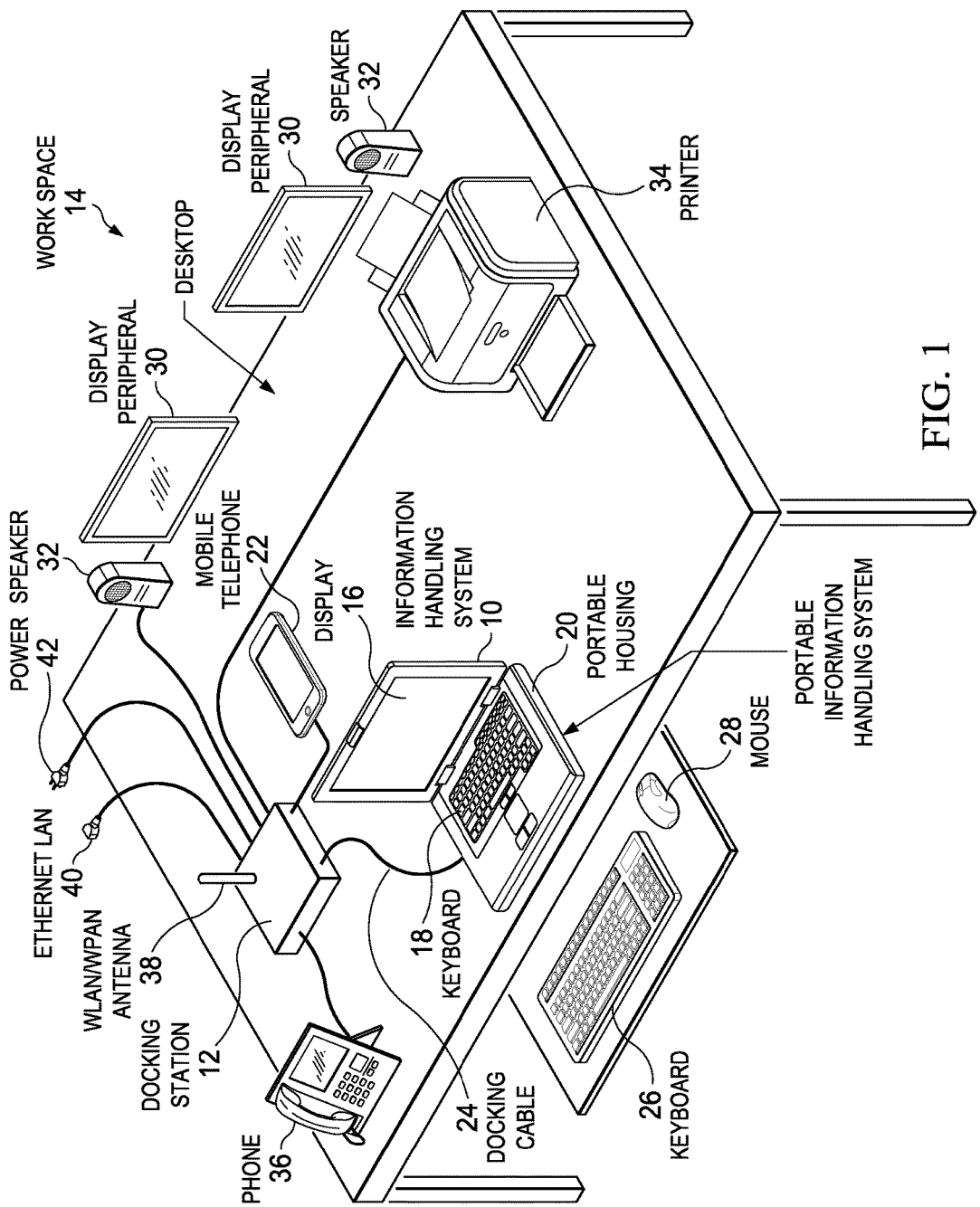
FIG. 1 depicts a portable information handling systems interfaced with a docking station and associated peripherals in a work space.

Referring now to FIG. 1, a portable information handling system 10 interfaces with a docking station 12 and associated peripherals in a work space 14. In the example embodiment, information handling system 10 is a portable information handling system having a rotationally-coupled display 16 and a keyboard 18 integrated with a portable housing 20, such as a conventional laptop with a clamshell configuration. In alternative embodiments, other types of portable information handling systems may interface with docking station 12, such as a mobile telephone 22 or similar tablet information handling system. In the example embodiment, portable information handling system 12 interfaces with a docking cable 24 that couples to a port of docking station 12 and portable information handling system 10. In alternative embodiments, portable information handling system 10 couples directly to docking station 12, such as by aligning an integrated docking port of portable information handling 10 over a docking port of docking station 12.

Docking station 12 provides an end user with a ready conversion at a work space 14 of portable information handling system 10 into a desktop-type of fixed configuration that interfaces with plural peripheral devices. For example, docking station 12 supports communication between information handling system 10 and a peripheral keyboard 26, a peripheral mouse 28, plural peripheral displays 30, peripheral speakers 32, a peripheral printer 34 and a peripheral telephone 36, such as a VoIP desktop telephone. Docking station 12 interfaces with the peripherals through cables that couple each peripheral to a peripheral port of docking station 12 or, alternatively, through wireless communication by wireless resources through a WLAN/WPAN antenna 38. Information handling system 10 communicates through docking cable 24 with docking station 12 to receive peripheral inputs and present outputs at the peripherals coupled to docking station 12. Docking station 12 provides a single connection point through which information handling system 10 interacts with the plural peripherals. In addition, docking station 12 provides infrastructure support to portable information handling system 10 for power and networking functions. For example, an Ethernet local area network (LAN) interface 40 provides network communications to docking station 12 to route and/or switch to portable information handling system 10. As another example, an external AC power connector 42 of docking station 12 accepts power from an AC supply and converts the power to a DC supply for transfer to information handling system 10 through docking cable 24.

In operation, docking station 12 supports operations of information handling system 10 through a single docking cable 24 by multiplexing information through plural data lanes of docking cable 24. For example, docking cable 24 combines a DisplayPort interface, with four data lanes, an auxiliary lane and a power interface, and a USB 2.0 interface, with two data lanes, to communicate visual and other peripheral information. Docking station 12 configures the data lanes and available wireless resources so that portable information handling system 10 operates in an efficient and effective manner. Upon an initial connection of docking cable 24 to portable information handling system 10, a docking manager on each of docking station 12 and information handling system 10 provide an initial configuration by temporarily establishing a data lane as a management bus, such as an I2C or SMBus. The management bus exchanges information regarding capabilities of portable information handling system 10 and docking station 12 to establish an initial configuration of communication and infrastructure resources. For example, docking station 12 provides a default configuration unless an embedded controller within information handling system 10 provides a different configuration through the management bus. After both information handling system 10 and docking station 12 have the initial configuration as communicated through the management bus, the management bus is removed and the data lanes are established according to the initial configuration. In the example embodiment, some examples of initial configurations include: four data lanes for DisplayPort and two data lanes for USB 2.0; two data lanes for DisplayPort and four data lanes for USB 3.0; and two data lanes for a first DisplayPort interface, two data lanes for a second DisplayPort interface, and two data lanes for a USB 2.0 interface. In alternative embodiments, additional data lanes may be included to support additional configurations.

Once a configuration is established between docking station 12 and information handling system 10, the docking managers of docking station 12 and information handling system 10 coordinate assignments of data lanes and wireless resources to meet processing needs and goals of an end user of information handling system 10. For example, in one embodiment docking station 12 assigns wireless resources of information handling system 10 to establish networked communications directly with peripherals to accomplish processing tasks. For instance, if an end user has a movie processed at information handling system 10 and presented at one display peripheral 30 and a spreadsheet processed at information handling system 10 and presented at a second display peripheral 30, then docking managers at docking station 12 and information handling system 10 cooperate to assign up to four data lanes of docking cable 24 to communicate the movie in high resolution and assign a wireless personal area network (WPAN), such as an 802.11 (ad) channel, to communicate the spreadsheet. In such an example, the refresh rate of different images presented at peripheral displays 30 is compared to assign the medium with the greatest available bandwidth to the image information having the greatest bandwidth consumption. However, the docking managers adjust to conditions present in work space 14 to alter the allocation of docking port cable 24 and wireless resource communication media as needed to compensate for other processing tasks. For instance, in the above example, two data lanes may be needed from docking cable 24 to provide network access or power so that the best image resolution results from communicating the movie images wirelessly and communicating the spreadsheet images through two data lanes of docking cable 24. Other types of peripheral information and infrastructure support may be considered by the docking managers as set forth in the example embodiments set forth below.

Figure 2:
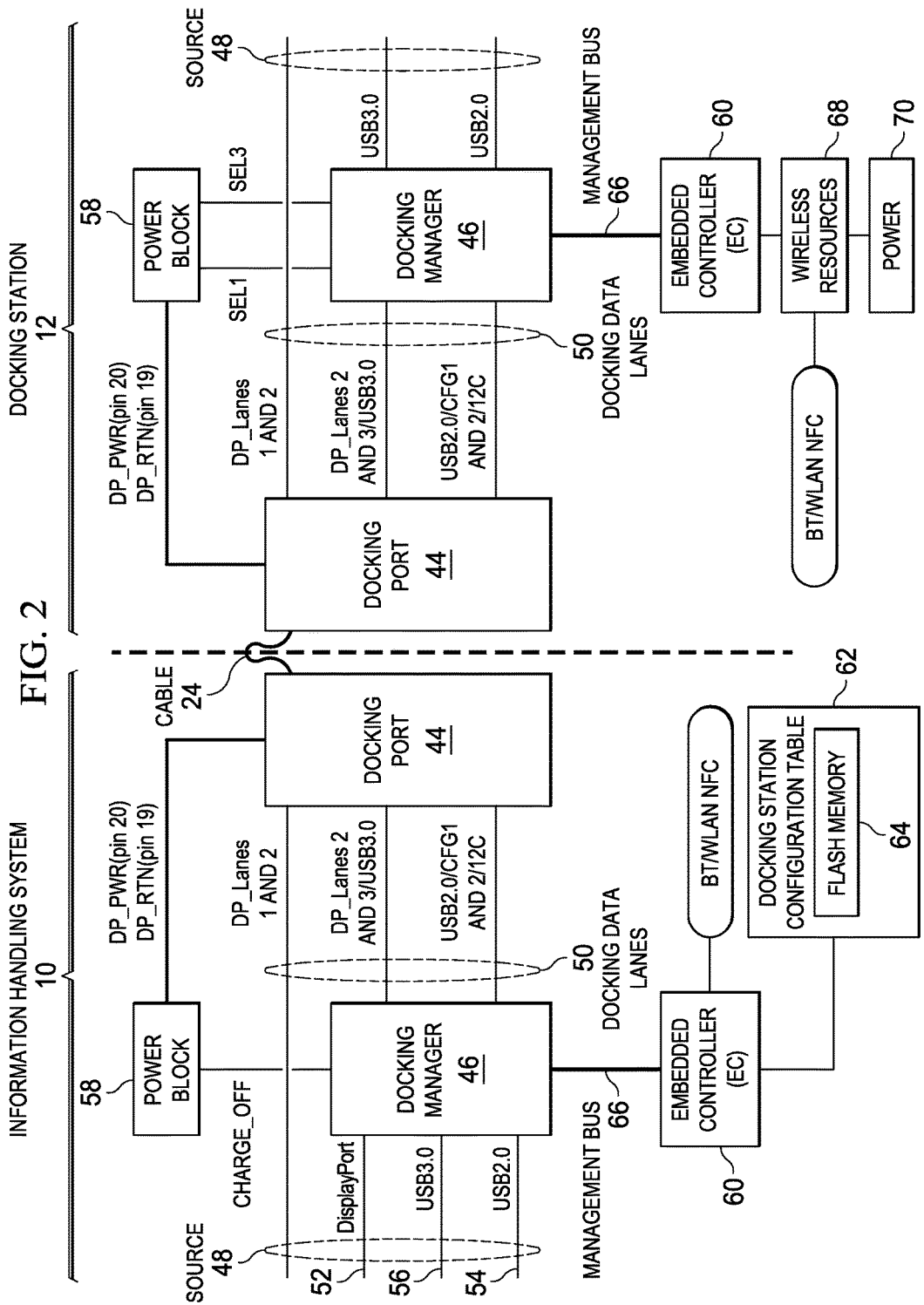
FIG. 2 depicts a circuit block diagram of an information handling system that temporarily configures a management bus at a docking port interface to control configuration of docking station assets.

Referring now to FIG. 2, a circuit block diagram depicts an information handling system 10 that temporarily configures a management bus at a docking port 44 interface to control configuration of docking station assets. Information handling system 10 interfaces with docking station 12 through a docking cable 24 that couples to a docking port 44 at each of information handling system 10 and docking station 12. In the example embodiment, a DockPort docking station interface establishes docking station functionality under the management of a docking manager 46, provided by instructions executing on a DockPort integrated circuit. Docking manager 46 multiplexes information from plural different sources 48 to communicate the information through docking data lanes 50. For example, inputs to docking manager 46 include uncompressed visual information sent through a DisplayPort interface 52 and other types of data sent through USB 2.0 and 3.0 interfaces 54 and 56. In addition, power is provided from a power block 58 through a power interface at docking port 44. Docking manager 46 on each of docking station 12 and information handling system 10 coordinate tasks for the docking data lanes and then multiplex information across the docking data lanes 50. For example, four lanes of input from a DisplayPort interface 52 is limited to two lanes across docking data lanes 50 to provide additional docking data lanes 50 for communicating information with a USB 3.0 protocol. Alternatively, a high resolution display presentation is supported by assigning four docking data lanes 50 to communicate DisplayPort information while limiting USB protocol communications to USB 2.0.

Docking managers 46 at information handling system 10 and docking station 12 coordinate the use of docking data lanes 50 by communicating configuration information through the docking data lanes 50. One difficulty with communication of configuration information through docking data lanes 50 is that the lanes have to establish an initial configuration in order to communicate configuration information that establishes an end user's docking station according to the end user's preferences. In order to provide a more rapid initial docking station configuration based upon preferences stored in memory of information handling system 10, docking manager 46 establishes a temporary management bus interface at an initial connection with docking station 12 and uses the management bus interface to establish an initial docking station configuration. In the example embodiment, an embedded controller 60, such as a keyboard controller in a portable information handling system, executes firmware instructions, such as BIOS instructions, to coordinate with docking manager 46 for establishing an initial docking station configuration according to a docking station configuration table 62 stored in flash memory 64. In alternative embodiments, alternative hardware, software or firmware devices may coordinate the establishment of an initial docking station configuration through the management bus interface. For instance, docking manager 46 may include instructions distributed through firmware or software of various components disposed in information handling system 10 and docking station 12.

As an example, when cable 24 couples to the docking port 44 of both information handling system 10 and docking station 12, a ground detect at each docking manager 46 initiates a temporary configuration of a data lane 50 as an I2C or SMBus. Once the management bus is established, instructions on embedded controller 60 of information handling system 10 obtain an identifier of docking station 12 and lookup the identifier in docking station configuration table 62. If a docking station configuration associated with the identifier is stored in flash memory 64, embedded controller 60 provides the docking station configuration through the management bus 66 to docking manager 46, which multiplexes the docking station configuration through the temporary management bus interface, docking ports 44 and to a docking manager 46 and embedded controller 60 at docking station 12. Once both docking managers 46 have the initial docking station configuration, each docking manager 46 applies the docking station configuration to configure each of the docking data lanes 50 with an appropriate protocol, such as a DisplayPort and/or USB protocol. During the configuration of data lanes 50, the temporary management interface is torn down so that the data lane 50 used to support the management interface may instead be used for communication of visual or other data. Allowing the embedded controller 60 of information handling system 10 to have I2C control provides the information handling system with flexibility in how configuration of docking station 12 is effectuated by passing I2C bus data through docking ports 44 during configuration. After initial configuration has taken place, additional temporary use of a data lane 50 as a management bus may be used to enforce configuration settings from information handling system 10, such as if an operating system hang-up occurs or if management bus control is desirable for other reasons.

In addition to establishing an initial configuration of data lanes 50, docking station configuration table 62 establishes an initial configuration for other docking station assets, such as wireless communication resources 68 and additional power capacity 70. Docking station 12 assets' initial configurations may be set by values stored in table 62 or by applying rules and/or values stored in table 62. For example, an end user can save settings for data lanes 50 that use two lanes for DisplayPort visual information and four lanes for USB information. In addition, the end user's settings can include a Bluetooth interface for a wireless keyboard and mouse associated with docking station 12 and an 802.11(ad) interface for a display associated with docking station 12, and an 802.11(n) interface for WLAN access. In such an example, information handling system 10 adapts to the assets of docking station 12 in a manner previously set-up and saved by an end user. However, assets at docking station 12 may change over time so that rules applied by docking managers 46 can further enhance an initial docking station configuration. If, for instance, a wireless display is unavailable at docking station 12, rules stored in table 62 may alter the initial configuration based upon communications from docking station 12 that indicate only wired displays are available. One example rule applied at embedded controller 60 of information handling system 10 might alter the initial assignment of data lanes 50 to communicate two sets of visual information through two pairs of DisplayPort lanes. Another example rule assigns data lanes 50 and wireless resources between two displays by order of refresh rate with the following ordered list of paired configurations: four lanes of DisplayPort and 802.11 (ad); 802.11 (ad) and two lanes of DisplayPort; and two lanes of DisplayPort and four lanes of USB 3.0 with compressed video.

In one alternative embodiment, if a wireless interface is established between docking station 12 wireless resources 68 and information handling system 10 before cable 24 is coupled to ports 44, the initial docking station configuration may be established based upon wireless communications so that the setup of a management interface can be bypassed. For example, information handling system 10 interfaces with a WLAN and looks up the WLAN identifier in docking station configuration table 62 to determine if the WLAN is associated with a store docking station 12. If so, information handling system 10 attempts to interface with the docking station 12 through the WLAN or through a WPAN interface, such as Bluetooth, to exchange configuration information. As another example, a near field communication (NFC) between the information handling system 10 and docking station 12 may provide configuration information between information handling system 10 and docking station 12. If configuration information is successfully exchanged, the use of a temporary management bus interface may be avoided or shortened to just a confirmation that the configured docking station 12 couples by cable 24 to information handling system 10.

Figure 3:
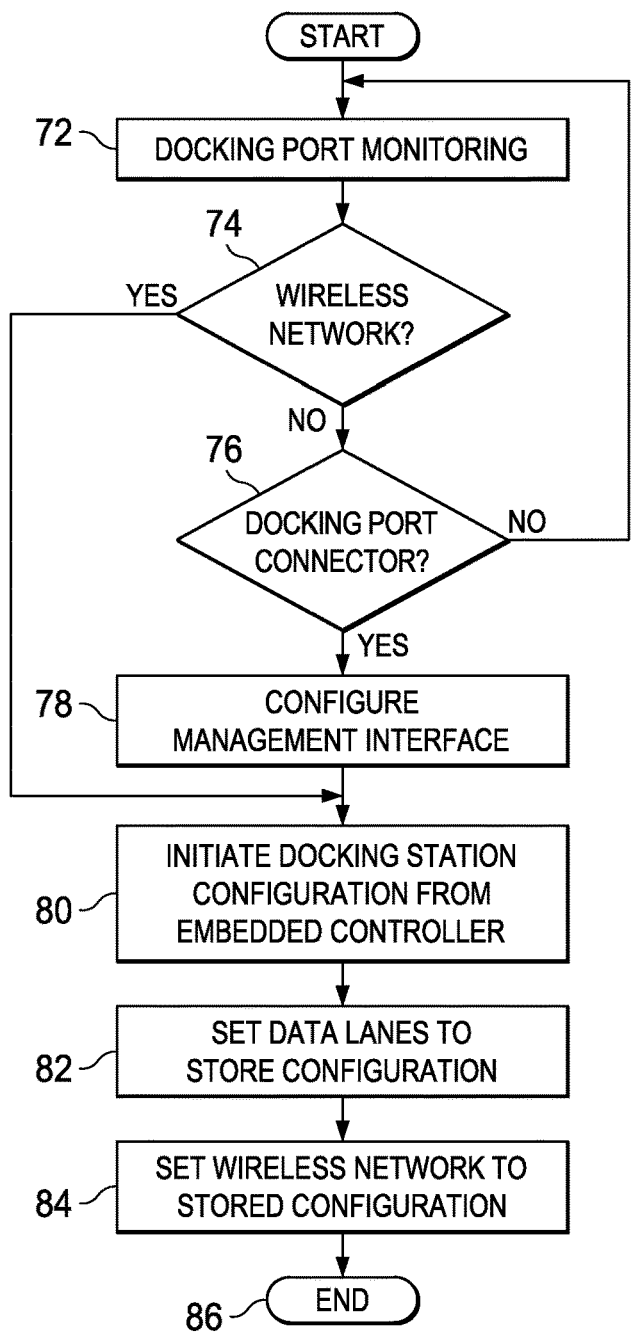
FIG. 3 depicts a flow diagram of a process for temporary configuration of a docking port data lane as a management bus interface.

Referring now to FIG. 3, a flow diagram depicts a process for temporary configuration of a docking port data lane as a management bus interface. The process begins at step 72 with monitoring of a docking port to detect an initial interface with a docking station. At step 74, a determination is made of whether a docking port is associated with any wireless networks detected by the information handling system wireless resources, such as a WLAN of a work space 14 or a WPAN of wireless resources of a docking station. If a wireless network is detected, the process continues to step 80 to initiate a docking station configuration as set forth below. If a wireless network is not detected, the process continues to step 76 to determine if a physical connection is made to a docking port of the information handling system. If neither a wireless or physical interface is established at step 76, the process returns to step 72 to continue monitoring for a docking port connection.

If at step 76 a docking port connection is detected by the information handling system, the process continues to step 78 to configure one or more data lanes of the docking port as a management interface. Configuration of a management bus at a data lane occurs at both the information handling system and docking station upon an initial detection of a connection so that the information handling system communicates at a firmware level, such as with its BIOS, to the docking station. At step 80, a docking station configuration is established at the information handling system and docking station based upon communications made through the management bus interface, or a wireless interface if one exists. Establishing a management bus interface allows direct communication of an information handling system embedded controller with an embedded controller of the docking station so that operating system involvement is not needed to initiate use of docking station assets. Providing control to the information handling system embedded controller for configuration of a docking station allows rapid set up of stored or default configurations that may depend upon an analysis of available docking station assets that is performed at the information handling system. At step 82, the docking station configuration is applied to set the data lanes of the docking port to the stored configuration. Setting the data lanes to the stored configuration tears down the management bus interface so that the data lane used to establish the management bus is used for host operating system level communications. At step 84, the wireless resources of the information handling system and docking station are then set according to the stored docking station configuration and, at step 86 the process ends.

Figure 4:
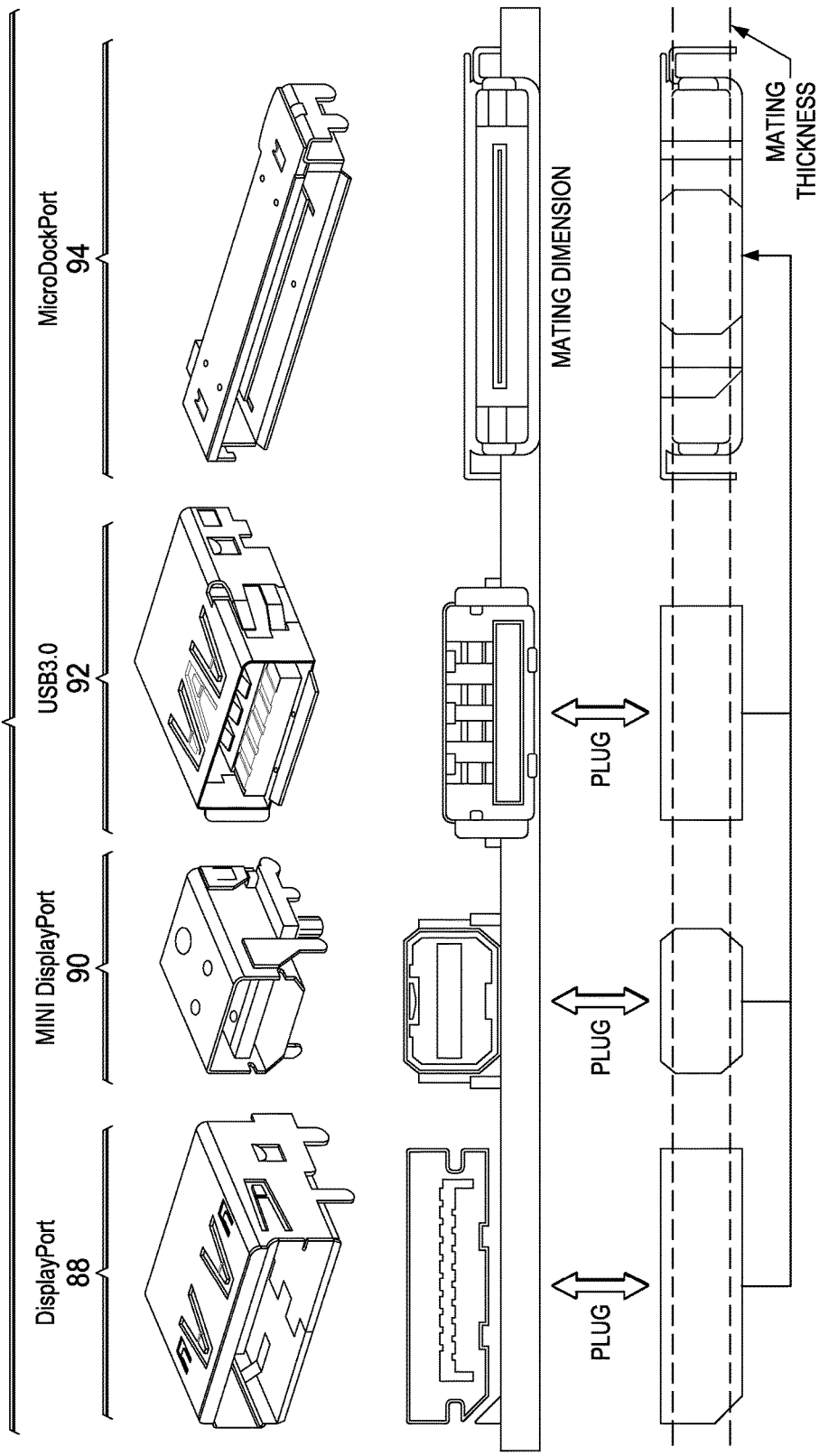
FIG. 4 depicts a low Z-factor docking port compared with available peripheral ports.

Referring now to FIG. 4, a low Z-factor docking port 94 is compared with available peripheral ports. The height, known as Z-factor, of a port effects the size of the housing that includes the port. The dimensions of a DisplayPort port 88, Mini DisplayPort port 90 and USB 3.0 port are compared with the dimensions of one example embodiment of a docking port 94 that supports docking with a docking station as described above. Efficient use of data lanes in the docking port 94 provides bandwidth for both uncompressed video information and USB data. For instance, four lanes of uncompressed video available from a DisplayPort port 88 are multiplexed with two additional lanes to selectively provide Mini DisplayPort functionality with two lanes and USB 2.0 with two lanes or USB 3.0 with four lanes. An auxiliary lane found in DisplayPort is supported with USB configurations and power transfer found in USB is supported with power transfer found in DisplayPort; hence the total number of lanes is decreased by combining functionalities with multiplexed communications. Temporary management bus interfaces as described above allow direct control from an information handling system embedded controller to the docking station through port 94 as needed. In addition, as set forth below, selective engagement of a power interface enhances power available through port 94 above that available from DisplayPort by including a USB power interface.

Figure 5:
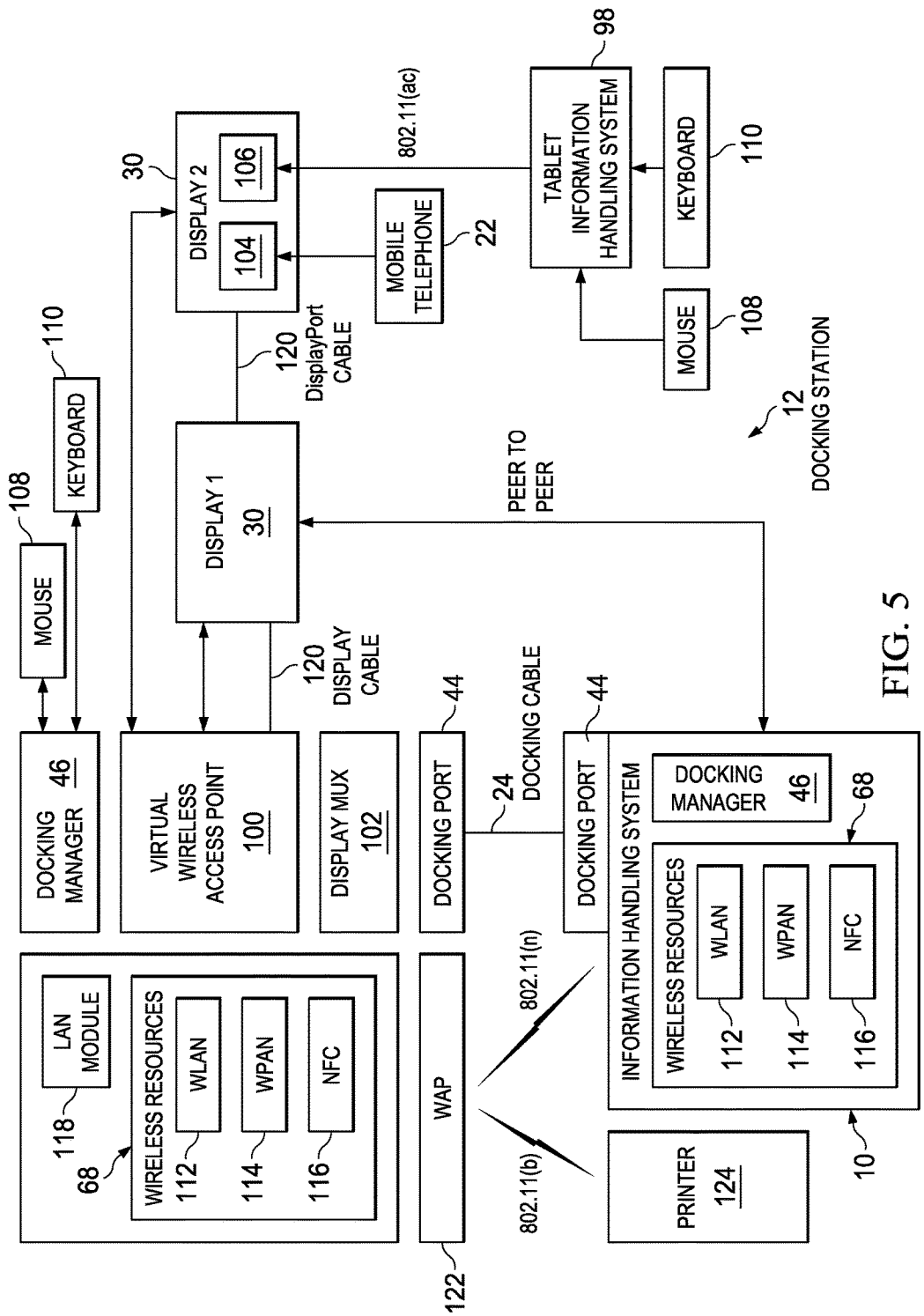
FIG. 5 depicts a block diagram of a system for allocation of wireless and wired communication media by a docking station between one or more information handling systems and peripherals.

Referring now to FIG. 5, a block diagram depicts a system for allocation of wireless and wired communication media by a docking station 12 between one or more information handling systems 10, 22 and 98, and plural peripherals. Information handling system 10 interfaces with docking station 12 through a docking cable 24 that connects between docking ports 44 as described above. A docking manager 46 on information handling system 10 and docking station 12 coordinates with a virtual wireless access point 100 executing on processing resources of docking station 12 to assign data lanes of docking port 44 and wireless communication channels to tasks that provide for efficient use of peripherals disposed in the work space 14. Virtual wireless access point 100 dynamically aggregates wireless technologies associated with a docking station 12, such as WiGig, WiFi, Bluetooth, WPAN, WLAN, etc. . . . , so that peripherals communicate with information handling systems and docking station 12 to make available bandwidths additive to wired bandwidth of docking cable 24. As an example, WiGig WPAN resources support wireless display presentation while WiFi resources supports other data, such as an Internet interface. As a further extension, wireless resources for video and data and assigned to tasks based upon the interfaces that devices have with wired resources, such as PCIE, DisplayPort and USB buses, so that devices supported by wired resources do not consume wireless bandwidth. In addition to effective sharing of wireless and wired connectivity, docking managers 46 and virtual wireless access point 100 coordinate to share peripheral resources between work space peripherals. For instance, clamshell, tablet and smartphone information handling systems share display space on a display 30 with a portion of the display space assigned to each information handling system. For example, a DisplayPort multiplexor 102 executing on docking station 12, such as a timing controller that selectively accepts multiple display input signals, overlays a smartphone information handling system 22 display presentation 104 received by a compressed WiFi signal and a tablet information handling system 98 display presentation 106 received by WiGig 802.11(ad) signal on top of a DisplayPort cable signal received through docking cable 24, and presents the combined displays at display peripheral 30. An end user can drop and drag tablet display 106 with a mouse 108 or keyboard 110, which interface by Bluetooth to tablet information handling system 98 and then by WiFi to docking station 12 for control at DisplayPort multiplexor 102.

In the example embodiment depicted by FIG. 5, docking station 12 and information handling system 10 are equipped with wireless resources that communicate with a plurality of protocols at plurality of frequency bands, with the frequency bands having a plurality of communication channels. One general category of wireless resources is wireless local area network (WLAN) resources 112 that communicate data at distances of approximately 100M in the 2.4 and 5 GHz frequency bands. WLAN resources 112 typically provide an alternative to wired Ethernet communication provided by a local area network (LAN) resource 118. Some examples of WLAN resources include 802.11(b, g, n and ac) compatible transceivers. Another general category of wireless resources is wireless personal area network (WPAN) resources 114 that communicate over shorter distances, such as 10M, in higher frequency ranges between 2.4 and 60 GHz as a replacement for wired connections with peripheral devices. Some examples of WPAN resources include Bluetooth and 802.11(ad). In one example embodiment WLAN and WPAN resources are provided with a WiGig or other proposed standard interface. Near field communication (NFC) resources 116 use low energy radio transmissions for short range communications of data. Wireless resources 68 of docking station 12 and information handling system 10 interface with each other and with peripheral devices as supported by the peripherals. In various embodiments wireless resources on docking station 12 and information handling system 10 have similar or different capabilities, which are tracked by virtual wireless access point 100. For instance, at an initial configuration of an information handling system 10 with a docking station 12, wireless capabilities of each are shared with each other and stored locally. In one example embodiment, virtual wireless access point 100 is a distributed application that executes at least in part on information handling system 10 so that assignments of wireless resources and wired resources of docking station 12 are managed at information handling system 10.

The operability of virtual wireless access point 100 is set forth below as examples of management of wired and wireless resources assignments based upon tasks associated with work space 14. The examples are not meant to limit the functionality but may be combined in various embodiments depending upon work space 14 work load and communication resources. In the example embodiments, virtual wireless access point 100 cooperates with docking managers 46 to coordinate assignments of tasks to wireless and/or wired communication media based upon the bandwidth consumed by tasks and user-selectable priorities of tasks.

One example of a task that is selectively assigned to plural wired and wireless communication media is the presentation of visual images at peripheral displays 30 from information processed at plural information handling systems 10, 22 and 98. Visual images with high refresh rates, such as a movie or game, tend to consume larger amounts of bandwidth and to have degraded presentation when bandwidth is not available. In contrast, visual images with low refresh rates, such as word processing documents or spreadsheets, tend to consume less bandwidth and, indeed, might refresh from memory of display 30 alone when not actively in use so that bandwidth consumption is effectively zero at times. Other tasks, such as viewing still picture images, have spikes of bandwidth use when new display presentations are loaded to a display 30. In one example embodiment, virtual wireless access point 100 assigns a movie presentation processed by information handling system 10 for display at a display peripheral 30 to a communication medium of four DisplayPort lanes defined in docking cable 24 to docking station 12 and then through four lanes of a DisplayPort cable 120 to the display 30. If four lanes of docking cable 24 are not available, virtual wireless access point 100 establishes a 60 GHz communication channel from information handling system 10 to docking station 12 to communicate the visual images wirelessly and then uses DisplayPort cable 120 to communicate visual information from docking station 12 to display 30. Alternatively, if the 60 GHz communication band has minimal use so that interference is not significant, virtual wireless access point 100 coordinates through docking managers 46 to establish a direct wireless communication between information handling system 10 to the display 30.

In addition to management of DisplayPort cable and 60 GHz wireless communication media for presenting visual images, virtual wireless access point 100 manages WLAN and USB protocol communications for presenting visual images. For example, if two data lanes of docking cable 24 are assigned for visual information and the remaining lanes are assigned to USB and/or power transfer, virtual wireless access point 100 selectively assigns display tasks to the data lanes having visual information as a refresh rate for a task increases, thus allowing uncompressed visual information to have rapid communication rates, while assigning display tasks having low refresh rates to communication as compressed visual information through a USB data lane. Thus, for instance, a user who is viewing pictures will have high bandwidth DisplayPort lanes available on docking cable 24 so that pictures are rapidly loaded and lower bandwidth USB lanes between loading of pictures when bandwidth is not needed. Similarly, if adequate bandwidth is available in a WLAN channel, virtual wireless access point 100 coordinates wireless transfer of compressed visual information through its own 802.11 wireless resources or through a wireless access point 122. In evaluating the communication media to assign for a particular task, virtual wireless access point 100 evaluates available bandwidth and the risk of interference with other networking tasks to assign a channel within a communication band for performing a task. Virtual wireless access point weighs the priority of tasks to determine which tasks should receive wireless bandwidth based in part on the amount of wired bandwidth that is available and the time sensitivity of a particular task. In various embodiments, some peripherals may lack a physical cable connection to a docking station peripheral port so that wireless communication with that peripheral will have a higher priority.

Another example of a task that is selectively assigned to plural wired and wireless communication media is the transfer of data between information handling systems, such as files. For instance, an end user who wishes to transfer information from information handling system 10 to tablet information handling system 98 has the transfer automatically coordinated by virtual wireless access point 100. Information handling system 10 sends a file through docking cable 24 USB data lanes for transfer to tablet information handling system 98 by a wireless communication determined by virtual wireless access point 100 based upon available wireless bandwidth, such as in the 2.4, 5 and 60 GHz bands, and the quality of wireless communication with tablet information handling system 98. In one embodiment, virtual wireless access point 100 establishes a direct peer-to-peer communication between information handling system 10 and tablet 98 to effectuate a file transfer, such as with an ad hoc WLAN in a communication channel assigned by virtual wireless access point 100. Peer-to-peer communication may be assigned by virtual wireless access point 100 in other types of circumstances and in other communication bands. As some examples, virtual wireless access point 100 coordinates a wireless transfer of video 104 from mobile telephone 22 in a selected of manners: peer-to-peer with information handling system 10, through docking cable 24 and DisplayPort cable 120; wirelessly from mobile telephone 22 to docking station 12 then through DisplayPort cable 120; or wirelessly directly to display 30 with an overlay performed by a timing controller of display 30 in a location determined by docking station 12. Other types of devices that may have similar selective communication through wired and wireless resources include keyboard devices 110, mouse devices 108, and printers 124.

Figure 6:
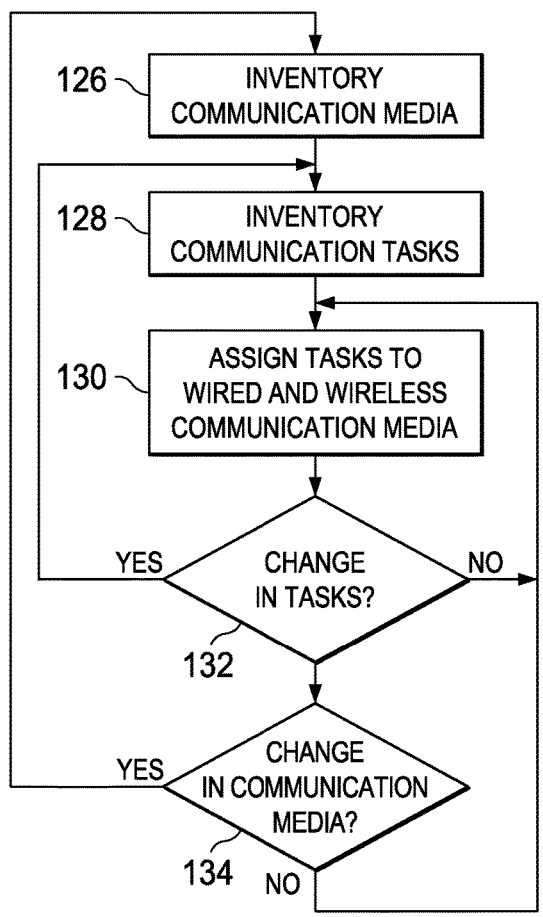
FIG. 6 depicts a flow diagram depicts a process for assigning communication media based upon processing tasks associated with a docking station.

Referring now to FIG. 6, a flow diagram depicts a process for assigning communication media based upon processing tasks associated with a docking station. The process starts at step 126 with an inventory or communication media available at the docking station, such as wired data lanes and wireless communication bands. The inventory includes, for instance, the number of docking port data lanes available for data transfer, the wireless resources of the information handling systems and docking station and the wired and wireless resources of docking station peripherals. At step 128, the process continues with an inventory of communication tasks associated with a docking station. Communication tasks are, for instance, based upon processing tasks performed at information handling systems interfaced with the docking station and include a rating for each tasks bandwidth consumption and need for timely response. For example, a movie has high bandwidth consumption with high timeliness while a spreadsheet has low bandwidth consumption and low timeliness. Ratings for relative importance of each processing task may be input by an end user. At step 130, communication tasks are assigned to wired and wireless communication media based upon their relative importance, their bandwidth consumption, their need for timeliness, and the available communication media. At step 132 a determination is made of whether a change in tasks has occurred. A change in tasks might occur if a new task is added or an existing task is deleted, or may occur if an existing task changes an operating constraint, such as with a change in an image depicted to an end user. If a change in tasks is detected, the process returns to step 128 to inventory tasks. If no change in tasks is detected, the process continues to step 134 to determine if a change in communication media has occurred. A change in communication media might occur if data lanes of a docking station port are assigned to power use as describe below, or if bandwidth consumption of a task or a near-by docking station changes, such as might increase frequency congestion and interference so that wireless transfer rates are impacted. If a change in communication media occurs, the process returns to step 126 to inventory communication media. If not, the process returns to step 130 to monitor the assigning of tasks based upon the current inventory of tasks and communication media.

Figure 7:
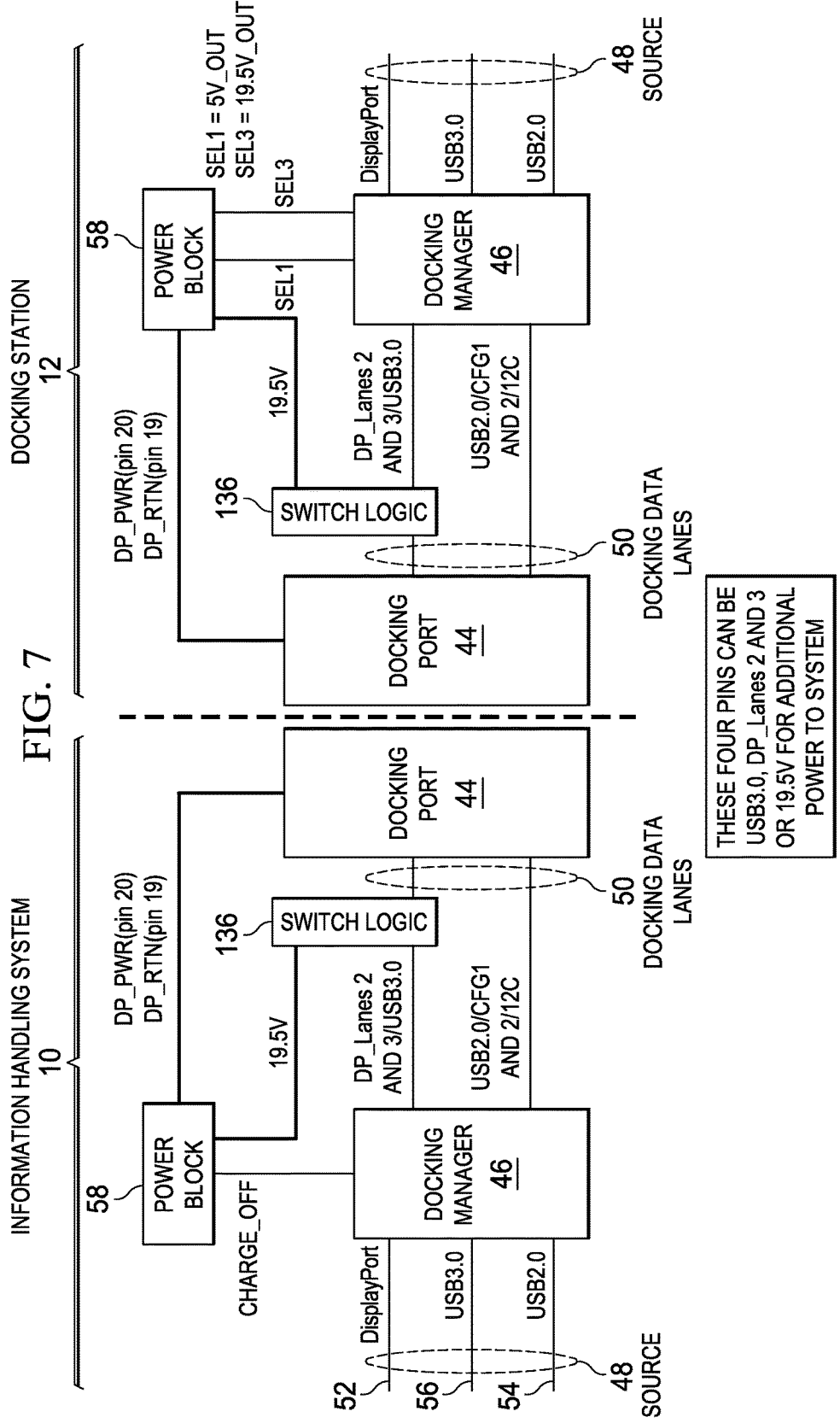
FIG. 7 depicts a circuit block diagram of a system for selective assignment of docking port data lanes for transferring power from a docking station to an information handling system.

Referring now to FIG. 7, a circuit block diagram depicts a system for selective assignment of docking port 44 data lanes 50 for transferring power from a docking station 12 to an information handling system 10. Docking manager 46 multiplexes DisplayPort, USB 2.0 and USB 3.0 inputs into shared data lanes 50 so that data lanes 50 can maintain communication with a DisplayPort or USB protocol. Power block 58 manages distribution of power from docking station 12 to information handling system 10 using the 65 W power transfer defined by the DisplayPort standard. In addition, power block 58 selectively assigns one or more of data lanes 50 to provide additional power based upon the USB 3.0 standard if additional power is needed by information handling system 10. For example, power block 58 at information handling system 10 and docking station 12 cooperate to engage a power switching logic 136 so that power proceeds through data lanes 50 that otherwise selectively support DisplayPort lanes 2 and 3 or USB 3.0 lanes. For instance, power transferred over data lanes 50 can provide an additional 65 W with 19.5V as the power is needed at information handling system 10, such as during battery charge or heavy processing tasks. In one embodiment, additional power is provided by adapting a single data lane 50 for power transfer according to USB 3.0 standards definitions and sharing a ground line with power transfer supported by the DisplayPort standards. In an alternative embodiment, a shared power ground allows multiple data lanes to provide power with multiple USB 3.0 power transfers over each data lane.

Power block 58 dynamically coordinates with docking manager 46 and virtual wireless access point 100 to assign data lanes 50 to power transfer as communication tasks and power consumption changes over time. For example, if communication through docking port 44 is relatively slight, power block 58 may assign a data lane 50 for power transfer to obtain more rapid battery charge. If communication increases, such as a spike associated with presenting pictures at a display, power block 58 releases the data lane 50 for communication of display information and accepts a slower battery charge. Similarly, if network communication increases, such as due to a download of a file, power block 58 releases the data lane 50 for network communication with USB. As another example, if a processing-intensive spreadsheet increases CPU power consumption while demanding relatively little communication bandwidth, power block 58 assigns a data lane 50 for power transfer to prevent throttling of the CPU. Power block 58 might, in another example, assign a data lane 50 for power transfer if adequate wireless communication is available to communicate information associated with the data lane by assigning communication to the wireless resource. Dynamic allocation of a data lane 50 to power transfer might also be used as needed to provide power from an information handling system to an external device, such as for charging a mobile telephone. Logic for determining when to assign a data lane 50 to power transfer may reside on just information handling system 10, just docking station 12, or be distributed between information handling system 10 and docking station 12.

Figure 8:
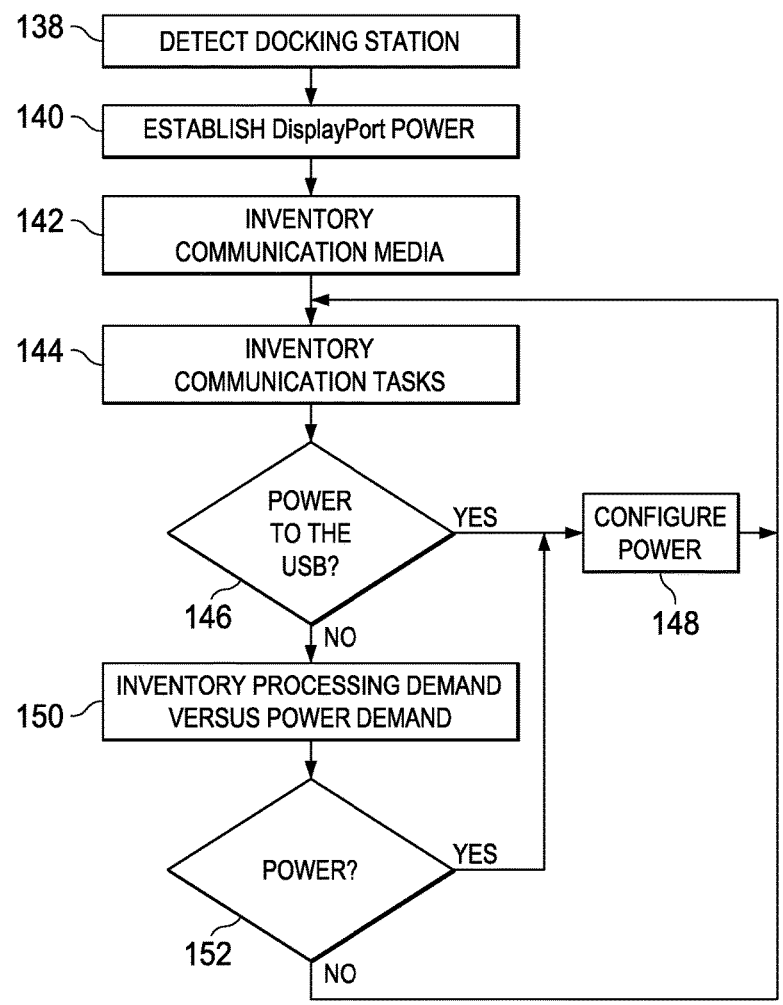
FIG. 8 depicts a flow diagram of a process for selective assignment of docking port data lanes for transferring power from a docking station to an information handling system.

Referring now to FIG. 8, a flow diagram depicts a process for selective assignment of docking port data lanes for transferring power from a docking station to an information handling system. The process starts at step 138 with detection of a docking station cable coupled an information handling system. At step 140, power transfer is established at up to 65 W according to the DisplayPort standard. At step 142, an inventory is performed of communication media to determine media available for transfer of information, including wired and wireless media of the docking station, information handling systems associated with the docking station and peripherals associated with the docking station. At step 144, an inventory is performed of communication tasks associated with the communication media, such as transfer of video and network data. At step 146, a determination is made of whether to establish power through a data lane with the USB protocol based upon a comparison of the need for the power and the need for the use of the data lane to transfer data. If additional power is needed and/or the impact on communication is acceptable, the process continues to step 148 to configure a data lane for power transfer and returns to step 144 to continue monitoring communication tasks. If at step 146, additional power transfer has an undue impact on communication of information, the process continues to step 150 to inventory processing demand versus power demand. At step 152, a determination is made of whether power needs at the information handling system take precedence over communication needs. If so, communication over a data lane is assigned to a different communication media and the process continues to step 148 to configure additional power transfer through a data lane. If not at step 152, the process returns to step 144 to continue monitoring communication tasks.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing, the processor operable to execute instructions for processing information;
   memory disposed in the housing, the memory interfaced with the processor and operable to store the instructions and information;
   a docking manager disposed in the housing, the docking manager operable to manage interactions with an external docking station through a docking port; and
   a docking port disposed in the housing, the docking port having plural pins in electrical communication with the docking manager, the docking port having a power pin interface to receive power from the external docking station and plural data lane-pins interfaced with plural data lanes to communicate information with the external docking station, the docking manager operable to adapt the data lanes to a selected of plural protocols;
   wherein the docking manager configures a switch that assigns one or more data lane pins to receive power from the external docking port in response to one or more predetermined condition, the one or more predetermined conditions including at least power demand associated with components disposed in the housing of within a predetermined amount of power available through the power interface.

2. The information handling system of claim 1 further comprising:
   a docking station separate from the housing, the docking station having a docking manager and a docking port with a power interface and plural data lanes; and
   a docking cable operable to connect to the docking station docking port and the housing docking port;
   wherein the docking station manager configures a switch that assigns one or more data lanes to send power to through the cable to the housing docking port in response to one or more predetermined conditions.

3. The information handling system of claim 1 wherein:
   a charger disposed in the housing and operable to charge a battery disposed in the housing; and
   a power controller disposed in the housing and interfaced with the charger, the power controller selectively commanding the data lanes to adapt to receive power based upon the one or more predetermined conditions.

4. The information handling system of claim 3 wherein the predetermined conditions comprise a battery charge state of less than a predetermined amount.

5. The information handling system of claim 3 wherein the predetermined conditions comprise data communication associated with the housing of less than a predetermined amount.

6. The information handling system of claim 3 wherein the predetermined conditions comprise wireless communication resources associated with the housing of at least a minimum amount.

7. The information handling system of claim 1 wherein the docking manager selectively adapts only one data lane to receive power from the external docking port, the one data lane sharing a ground with the power interface.

8. A method for powering an information handling system from a docking station, the method comprising:
   inserting a docking connector into a docking port of the information handling system, the docking connector and docking port having plural pins aligned to physically contact each other;
   providing power from the docking station to the information handling system through a power interface pin of the docking port;
   communicating information between the docking station and the information handling system through plural data lane pins of the docking port; and
   configuring switching logic to assign one or more data lane pins to provide power from the docking station to the information handling system in response to one or more predetermined conditions, the power provided instead of communicating information over the one or more data lane pins;
   wherein the one or more predetermined conditions comprise at least power demand associated with components disposed in the information handling system of within a predetermined amount of power available through the power interface.

9. The method of claim 8 wherein the one or more predetermined conditions comprise a battery charge at the information handling system of a predetermined amount.

10. The method of claim 8 wherein the one or more predetermined conditions comprise predetermined wireless communication resources for communication of information between the information handling system and the docking station.

11. The method of claim 8 wherein the one or more predetermined conditions comprise predetermined wireless communication resources for communication of information between the information handling system and peripherals associated with the docking station.

12. The method of claim 8 wherein configuring switching logic to assign one or more data lane pins to provide power further comprises:
   determining the one or more data lane pins to adapt to provide power;
   adapting wireless resources of the information handling system to communicate information associated with the determined one or more data lane pins;
   establishing communication through the wireless resources of the information associated with the determined one or more data lane pins; and
   in response to establishing communication, providing power through the one or more determined data lane pins instead of communication.

13. The method of claim 12 wherein establishing communication further comprises:

compressing video information at the information handling system; and sending the compressed video information from the information handling system to the display at least in part through a wireless interface.

14. A docking station comprising:

a housing;

one or more docking ports disposed at the housing, each docking port having plural pins configured to interface with an information handling system docking connector, each docking port having a power interface pin to provide power to the information handling system and plural data lane pins to communicate information with the information handling system;

one or more peripheral ports disposed at the housing, each peripheral port configured to interface with a peripheral device;

a docking manager disposed in the housing and interfaced with the one or more docking ports, the docking manager including switching logic for configuring one or more of the data lane pins of the one or more docking ports to provide power to the information handling system in response to one or more predetermined conditions, the power provided instead of communicating information, the one or more predetermined conditions including at least power demand from one of the docking ports of within a predetermined amount of power available through the one of the docking ports.

15. The docking station of claim 14 further comprising wireless resources to communicate with the information handling system, wherein the docking manager is further operable to configure the wireless resources to communicate information with the information handling system in response to a configuration of one or more data lanes to provide power.

16. The docking station of claim 14 wherein the peripheral ports comprise one or more display ports for communicating visual information from the information handling system to one or more displays, wherein the docking manager configures one or more of the data lanes of the one or more docking ports to communicate compressed visual information from the information handling system for presentation at the one or more displays in response to a configuration of one or more data lanes to provide power.

17. The docking station of claim 14 wherein the peripheral ports comprise one or more display ports for communicating visual information from the information handling system to one or more displays, the docking station further comprising wireless resources for communicating information with the information handling system, and wherein the docking manager, in response to a configuration of one or more data lanes to provide power, adjusts one or more of the data lanes of the one or more docking ports to communicate visual information from the information handling system for presentation at the one or more displays and to adjust the wireless resources to communicate data associated with the adjusted data lanes.

18. The docking station of claim 17 wherein the wireless resources communicate the data with a wireless USB protocol.

* * * * *